(12) United States Patent
Moshe et al.

(10) Patent No.: US 9,922,173 B2
(45) Date of Patent: Mar. 20, 2018

(54) DIGITAL RIGHTS MANAGEMENT

(71) Applicant: Claydo Lab Ltd., Tel-Aviv (IL)

(72) Inventors: Oren Moshe, Tel-Aviv (IL); Oren J. Maurice, Moshava Yokneam (IL); Robert Anders, Tel-Aviv (IL); Xuf Mils, Jaffa (IL); Shai Snir, Tel-Aviv (IL)

(73) Assignee: Claydo Lab Ltd., Tel-Aviv (IL)

( * ) Notice: Subject to any disclaimer, the term of this patent is extended or adjusted under 35 U.S.C. 154(b) by 113 days.

(21) Appl. No.: 14/856,790

(22) Filed: Sep. 17, 2015

(65) Prior Publication Data

US 2016/0085945 A1    Mar. 24, 2016

Related U.S. Application Data

(60) Provisional application No. 62/051,990, filed on Sep. 18, 2014.

(51) Int. Cl.
  *G06F 21/10* (2013.01)
  *H04N 1/44* (2006.01)
  *G06F 21/84* (2013.01)

(52) U.S. Cl.
  CPC ............ *G06F 21/10* (2013.01); *G06F 21/84* (2013.01); *H04N 1/444* (2013.01); *H04N 1/4493* (2013.01); *G06F 2221/2107* (2013.01)

(58) Field of Classification Search
  None
  See application file for complete search history.

(56) References Cited

U.S. PATENT DOCUMENTS

| | | | | |
|---|---|---|---|---|
| 5,426,512 | A * | 6/1995 | Watson | H04N 19/176 375/E7.13 |
| 2003/0095603 | A1* | 5/2003 | Lan | H04N 19/156 375/240.17 |
| 2005/0046817 | A1* | 3/2005 | Wolfe | G11B 7/24094 355/54 |
| 2006/0221760 | A1* | 10/2006 | Chen | H04N 19/61 365/189.05 |
| 2007/0217607 | A1* | 9/2007 | Thiagarajan | H03M 7/30 380/217 |
| 2008/0240435 | A1* | 10/2008 | Celik | G06T 1/0028 380/255 |

(Continued)

FOREIGN PATENT DOCUMENTS

WO    WO03/013137 A1 * 11/2001

*Primary Examiner* — Kaveh Abrishamkar

(57) ABSTRACT

A method of DRM protection for an image or a series of images or a succession of video frames, comprises: generating a reversible transform; applying the reversible transform to a source image; compressing the transformed image into a bitstream; and supplying the bitstream to a recipient for consumption. At the recipient the bitstream is decompressed and sent to the image display hardware with the transform still in place. A key is used to generate the inverse transform at the recipient and the inverse transform is then carried out in the image display hardware. An additional transform may be applied to the image following the inverse transform to offset pixels from an average value. Thus the source image itself is never exposed at the recipient although the image can be correctly viewed.

16 Claims, 6 Drawing Sheets
(4 of 6 Drawing Sheet(s) Filed in Color)

(56) References Cited

U.S. PATENT DOCUMENTS

| | | | |
|---|---|---|---|
| 2009/0095912 A1* | 4/2009 | Slinger | G01T 1/295 250/363.06 |
| 2009/0245511 A1* | 10/2009 | Nakagata | H04N 1/4486 380/54 |
| 2010/0169649 A1* | 7/2010 | Haas | H04N 1/4486 713/176 |
| 2016/0330492 A1* | 11/2016 | Eguchi | H04N 19/426 |

* cited by examiner

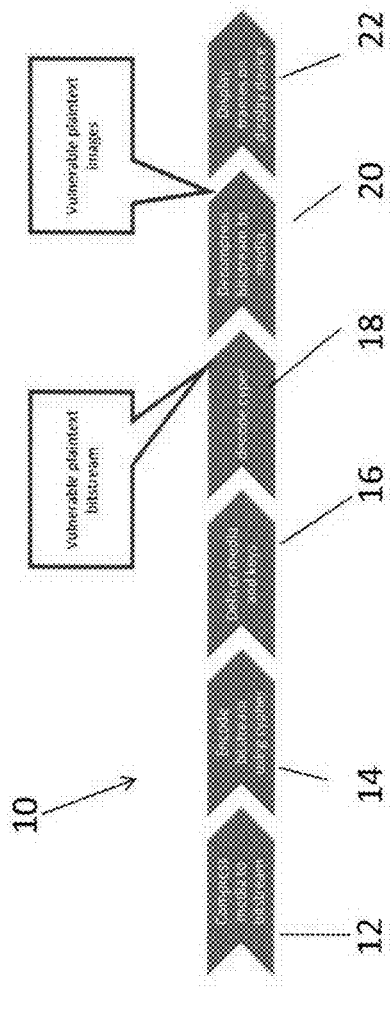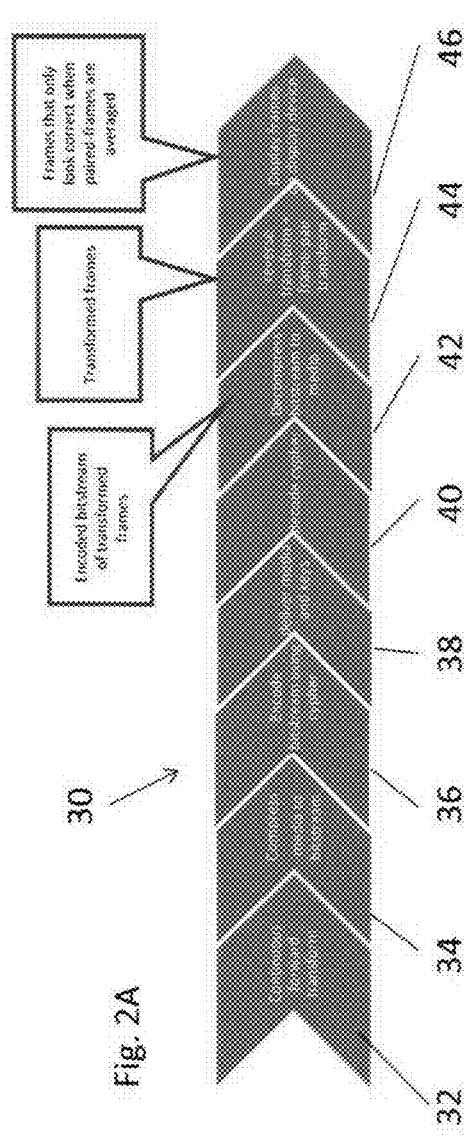
Fig. 1
Fig. 2A

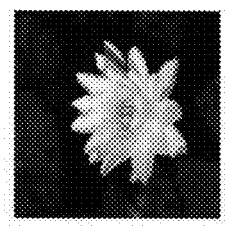
Fig. 7
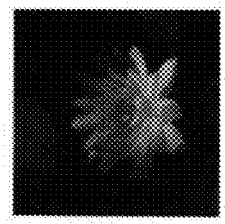
Fig. 8
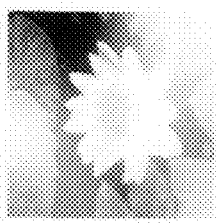
Fig. 9
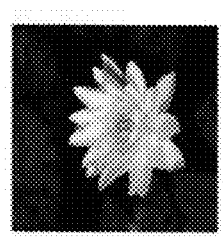
Fig. 10
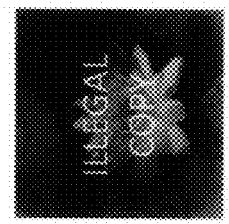
Fig. 11
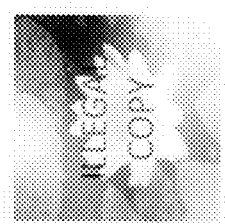
Fig. 12
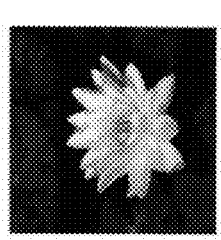
Fig. 13
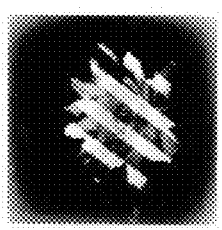
Fig. 14
Fig. 15

DIGITAL RIGHTS MANAGEMENT

RELATED APPLICATION

This application claims the benefit of priority under 35 USC § 119(e) of U.S. Provisional Patent Application No. 62/051,990 filed on Sep. 18, 2014, the contents of which are incorporated herein by reference in their entirety.

FIELD AND BACKGROUND OF THE INVENTION

The present invention, in some embodiments thereof, relates to an apparatus and method for digital rights management and, more particularly, but not exclusively, to digital rights management for images, video and artistic works in general, particularly digital art.

DRM solutions are often necessary when trying to protect the IP of the media creator. In images and art initially created in digital format, DRM is particularly necessary as it defends, not a copy of the work but the work itself.

Media files (for example JPG and PNG for images, MPEG variants for video) are usually delivered to consumers in a compressed form, and it is common practice to encode the compressed bit-stream using common encryption methods such as AES (with key-delivery mechanisms not covered here).

However, as the playback mechanism operates, it has to decode the bit-stream before decompressing it, giving attackers a perfect sampling point, in which the plaintext bitstream exists, and can be copied, given the right means, without fully de-constructing the entire playback pipeline. The bitstream can be extracted and subsequently, when provided to a suitable decompressor, may provide a hacked version of the work.

Another convenient attack vector is to grab the fully decoded image (or images, in the case of video streams)—This is less desirable as it presents the attacker with a much higher volume of data to capture, and a "generation loss" with regards to the quality of the material, but it is a viable attack none the less.

The present embodiments are aimed at denying the above attacks and in general ensuring that there is no plaintext version of the work available to be hacked.

SUMMARY OF THE INVENTION

The present embodiments apply a transform to the image prior to compression and encoding. The transform is still there after decoding and decompression and may be retained until the final pixels are calculated for display so that at no point is the plaintext version of the image available for hacking.

According to an aspect of some embodiments of the present invention there is provided a method of DRM protection for an image or a series of images or a succession of video frames, the method comprising:
generating a reversible transform;
applying the reversible transform to a source image;
compressing the transformed image into a bitstream;
supplying the bitstream to a recipient for consumption, the transform ensuring that a decompression operation at the recipient does not reveal the source image.

In an embodiment, the generating a reversible transform comprises generating a grid of pixels with varying values and then interpolating between the pixels to form a mask.

In an embodiment, each pixel value of the mask is added to a corresponding pixel value of the source image.

In an embodiment, the source image pixel value is an 8-bit value and the mask value is a 7-bit value and the source image is right shifted one place prior to the adding.

In an embodiment, the source image pixel value is an 8-bit value placed within a 9 bit value, and the mask value is a 7-bit value.

In an embodiment, the generating the reversible transform comprises generating a grid of pixels, and shifting each pixel by a variable number up to a predetermined maximum of pixel positions to form a map, and the applying the transform comprises mapping the source image using the map to form a geometrically distorted version of the source image.

An embodiment may further comprise generating a key that enables generation of an inverse of the transform; and supplying to the recipient a user client and the key.

According to a second aspect of the present invention there is provided a method of managing DRM protection at an end user for an image or a series of images or a succession of video frames, the method comprising:
receiving from a source, a bitstream, the bitstream comprising a compressed version of a reversibly transformed source image or a series of source images or a succession of source video frames and a key;
decompressing the bitstream;
supplying the decompressed bitstream to image display hardware;
using the key to create an inverse transform of a reversible transform used on the source;
applying the inverse transform at the image display hardware; and
displaying the image or the series of images or the succession of video frames.

In an embodiment, the generating an inverse of the transform comprises generating a grid of pixels with values extracted from the key and then interpolating between the pixels to form a mask.

In an embodiment, each pixel value of the mask is subtracted from to a corresponding pixel value of the source image.

In an embodiment, a source image pixel value is an 8-bit value and a mask value is a 7-bit value and the source image is left shifted one place following the subtracting.

In an embodiment, the generating the inverse of the transform comprises generating a grid of pixels, and shifting each pixel by a variable number taken from the key to form a map, and the applying the inverse transform comprises mapping an image extracted from the decompressed bitstream using the map to recover an original geometry of the source image.

An embodiment may apply offsets, subsequently to the applying the inverse transform and prior to the display, for successive frames, for corresponding pairs of pixels in each frame, the offsets applied to each pixel such that an average value of each respective pair is retained.

An embodiment may comprise obtaining the offsets by generating a grid of pixels with varying values, interpolating between the pixels to form a mask, and for each of the pair of pixels, using a corresponding mask pixel value as a respective offset.

According to a third aspect of the present invention there is provided a method of DRM protection for an image or a series of images or a succession of video frames, the method comprising:
generating a reversible transform;
applying the reversible transform to a source image;

compressing the transformed image into a bitstream;
supplying the bitstream to a recipient for consumption, the transform ensuring that a decompression operation at the recipient does not reveal the source image; and
at the recipient:
decompressing the bitstream;
supplying the decompressed bitstream to image display hardware;
using a key to create an inverse transform of the reversible transform used on the source;
at the image display hardware applying the inverse transform; and
displaying the image or the series of images or the succession of video frames.

In an embodiment, the generating a reversible transform comprises generating a grid of pixels with varying values and then interpolating between the pixels to form a mask and wherein the generating an inverse of the transform comprises generating a grid of pixels with values extracted from a key and then interpolating between the pixels to reconstruct the mask.

In an embodiment, the generating the reversible transform comprises:
generating a grid of pixels, and shifting each pixel by a variable number up to a predetermined maximum of pixel positions to form a map; and the applying the transform comprises mapping the source image using the map to form a geometrically distorted version of the source image;
and wherein the generating the inverse of the transform comprises:
generating a grid of pixels, and shifting each pixel by a variable number taken from a key to form a map, and the applying the inverse transform comprises mapping an image extracted from the decompressed bitstream using the map to recover an original geometry of the source image.

The method may comprise, subsequently to the applying the inverse transform and prior to the display, for successive frames, for corresponding pairs of pixels in each frame, applying offsets to each pixel such that an average value of each respective pair is retained.

The offsets may be obtained by generating a grid of pixels with varying values, interpolating between the pixels to form a mask, and for each of the pair of pixels, using a corresponding mask pixel value as a respective offset.

According to a fourth aspect of the present invention there is provided apparatus for DRM protection for an image or a series of images or a succession of video frames, the apparatus comprising:
a transform generator configured to generate a reversible transform;
a transformation unit configured to apply the reversible transform to a source image;
a compression unit configured to compress the transformed image into a bitstream;
an output configured to supply the bitstream to a recipient for consumption, the transform ensuring that a decompression operation at the recipient does not reveal the source image.

According to a fifth aspect of the present invention there is provided apparatus for managing DRM protection at an end user for an image or a series of images or a succession of video frames, the apparatus comprising:
an input for receiving from a source, a bitstream, the bitstream comprising a compressed version of a reversibly transformed source image or a series of source images or a succession of source video frames and a key;
a decompressor for decompressing the bitstream;
an inverse transform unit configured to use the key to create an inverse transform of a reversible transform used on the source;
image display hardware configured to apply the inverse transform at the image display hardware and display the image or the series of images or the succession of video frames.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

The patent or application file contains at least one drawing executed in color. Copies of this patent or patent application publication with color drawing(s) will be provided by the Office upon request and payment of the necessary fee.

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:
FIG. 1 is a simplified diagram showing a prior art DRM pipeline;
FIG. 2A is a simplified diagram showing a DRM pipeline according to a first embodiment of the present invention.

FIG. 7 illustrates the application of a first of a frame pair of transforms, based on FIG. 4A, to the image of FIG. 5A according to an embodiment of the present invention;

FIG. 8 illustrates the application of a second of a frame pair of transforms to the image of FIG. 5A according to an embodiment of the present invention;

FIG. 9 illustrates how the perceived resultant of FIGS. 7 and 8 recovers the original image of FIGS. 5A-C;

FIG. 10 illustrates the application of a first of a second frame pair of transforms, based on FIG. 4B, to the image of FIG. 5B according to an embodiment of the present invention;

FIG. 11 illustrates the application of a second of the second frame pair of transforms to the image of FIG. 5B according to an embodiment of the present invention;

FIG. 12 illustrates how the perceived resultant of FIGS. 10 and 11 recovers the original image of FIGS. 5A-C;

FIG. 13 illustrates the application of a first of a third frame pair of transforms, based on FIG. 4C, to the image of FIG. 5C, according to an embodiment of the present invention;

FIG. 14 illustrates the application of a second of the third frame pair of transforms to the image of FIG. 5C according to an embodiment of the present invention; and FIG. 15 illustrates how the perceived resultant of FIGS. 13 and 14 recovers the original image of FIGS. 5A-C.

DESCRIPTION OF SPECIFIC EMBODIMENTS OF THE INVENTION

Figure 2B:
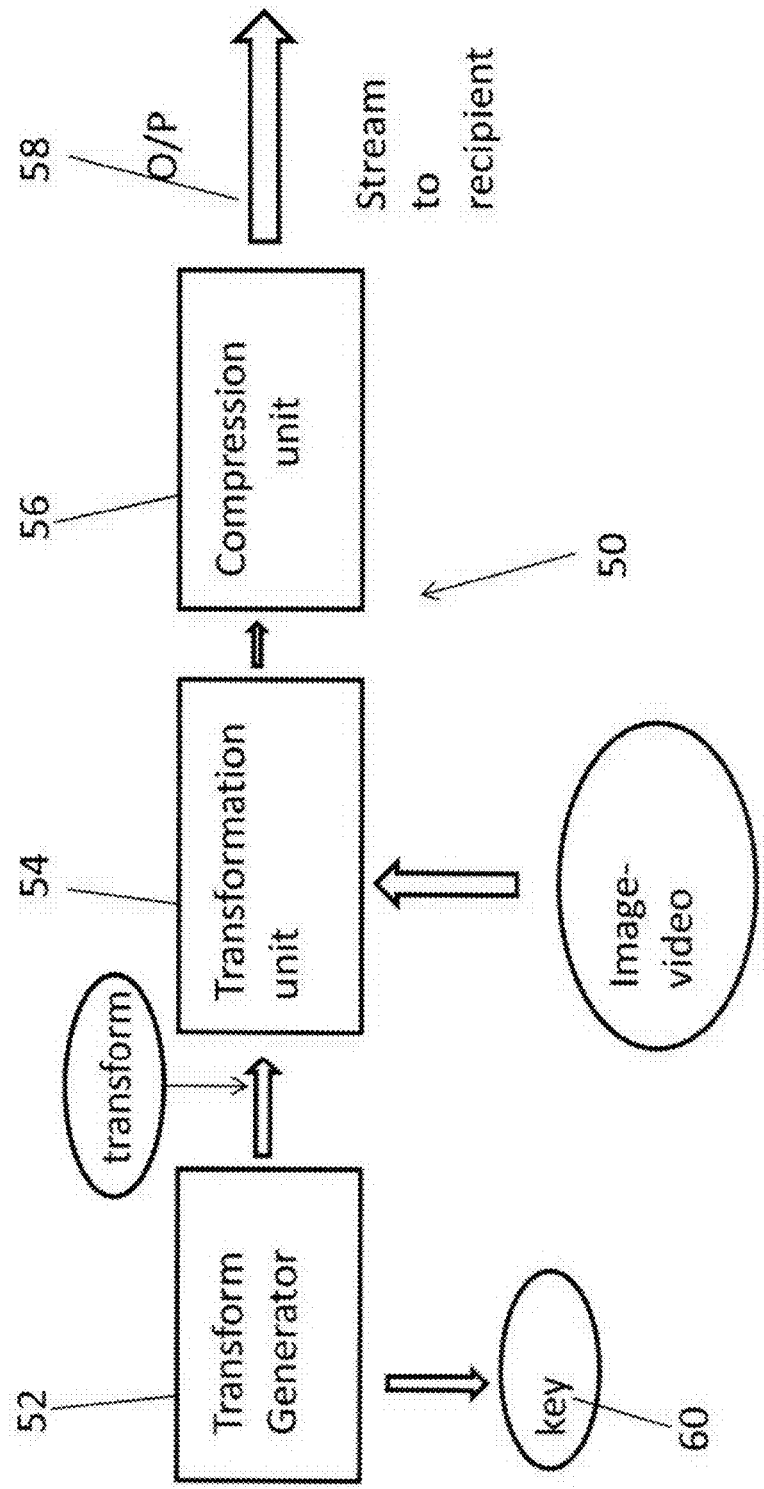
FIG. 2B is a simplified block diagram showing apparatus for generating a DRM protected bitstream according to an embodiment of the present invention.

The present invention, in some embodiments thereof, relates to apparatus and method for digital rights management and, more particularly, but not exclusively, to digital rights management for images and digital art in general.

The present embodiments may help make a hacking attack more difficult, and may at the very least much more work from the attacker to perform the attack, by eliminating both points in the pipeline in which a full plaintext copy of the protected media exists.

The present embodiments may include the following:

1. Before compressing the source image(s) into a bitstream, a transform is applied to the images which makes them appear unacceptable for consumption, but which is still reversible, and retains spatial (and in the case of video, temporal) continuity.
2. The transformed image(s) may be encoded using a common media encoder, such as JPEG or MPEG. The fact that the transformation is continuous means that the transform may create a minimum of artifacts when the transformed media is compressed, and then decompressed, as the JPEG and MPEG Codecs are designed for the compression of naturally occurring continuous gradients.
3. The bitstream may at this point get encoded yet again with a common stream cipher, the way DRM-protected media is encoded with a more common DRM, for extra protection. As the transform has already degraded the material, subsequent encoding is merely optional.
4. The media may then be delivered to the customer, the key-delivery taking place in any of the commonly acceptable ways known in DRM solutions in general, such as time-based sealed key generating cards, for instance. The key delivery part of the process need not be changed by the present embodiments.
5. At the decoder, if the optional additional encoding has been applied, then decoding may be applied at this point, in the same way as with existing DRM systems.
6. The bitstream is decompressed, resulting in the transformed images.
7. The image(s) may then be fed into the display processor (which may be an ASIC, or a programmable GPU, or a part of a graphics card), which performs two actions on every pixel that passes through, one by one: It performs the inverse transform, and applies an additional transform to the pixels, which results in the sum of every two consecutive displayed frames average value (per pixel) being the original pixel's value for that point. Note that this can apply both to video (for which the source frame-rate must be dropped to half of the display device's rate, so that two consecutive displayed frames represent a single source frame, and to still images, where the pairs of output frames all represent the same image). The human eye tends to average swiftly-flickering pixels, leading to the original image(s) being perceived by the consumer. The additional transform ensures that at no point does the original digital content exist on the system.
8. As an alternative to the above, the averaging can be left out and the inverse transform can be applied alone, leading to a less secure result but with higher output-quality.

As will be discussed in greater detail hereinbelow, the pipeline described above does not have the two vulnerability points discussed in the background and in FIG. 1, and may thus require an attacker to perform more steps in order to obtain the plaintext media.

For purposes of better understanding some embodiments of the present invention, as illustrated in FIGS. 2-9 of the drawings, reference is first made to the construction and operation of a conventional DRM pipeline as illustrated in FIG. 1.

FIG. 1 is a simplified pipeline diagram showing traditional DRM data flow and illustrating the vulnerabilities. Pipeline 10 begins with compression 12 of the media into a bitstream. The bitstream is then encoded 14. The media and the keys are delivered 16 to the end user. The media is decoded 18 using the keys and then the bitstream is decompressed 20 to recover the media, which may then be displayed 22 on the display device.

The plaintext bitstream is available beyond the decoding stage 18 and can be obtained by hacking, at which point the hacked bitstream only requires conventional decompression to be displayed. Beyond the decompression stage 20 the actual media is available.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Reference is now made to FIG. 2A, which is a simplified pipeline diagram showing a DRM flow 30 according to an embodiment of the present invention. The initial media is firstly subject 32 to a transform. The transform is reversible and suitable transforms are discussed in greater detail below. The transforms are selected to set the media below a selected threshold level of usability. The transformed media is then compressed 34 into a bitstream, and the bitstream is optionally encoded 36.

Delivery 38 of the media and keys is conventional and then at the recipient's end the media is decoded 40 as necessary, and decompressed 42. In stage 44 the media is inverse transformed but at the same time a frame-pair transform is carried out as discussed above so that the correct pixel value in successive frames is preserved as the average of the pixel values of two successive frames. Finally, the frames are displayed 46, using a version of the media that looks correct to the viewing eye but is actually not correct.

In pipeline 30, the bitstream that is available after decompressing 40 still has the transform, and likewise the media after decompression 42 also retains the transform. After stage 44 the transform has been removed but a new transform has been added so that the result is still incorrect, and in any event inverse transform 44 may be carried out close to the display device so as to make capture of the media more difficult.

Reference is now made to FIG. 2B which is a simplified block diagram showing apparatus for generating and sending a data stream according to the present embodiments.

Apparatus 50 provides a DRM protected bitstream from an image or a series of images or a succession of video frames. The apparatus comprises a transform generator 52 which generates a reversible transform. Examples of the reversible transform are discussed below. Transformation unit 54 applies the reversible transform to a source image or video etc.

Compression unit 56 compresses the transformed image into a bitstream, and an output 58 supplies the bitstream to a recipient for consumption. The insertion of the transform prior to compression ensures that a decompression operation at the recipient is not sufficient to reveal the full quality source image, video etc.

The transform generator 52 also produces a key 60, which can be used to produce the corresponding inverse transform.

Figure 2C:
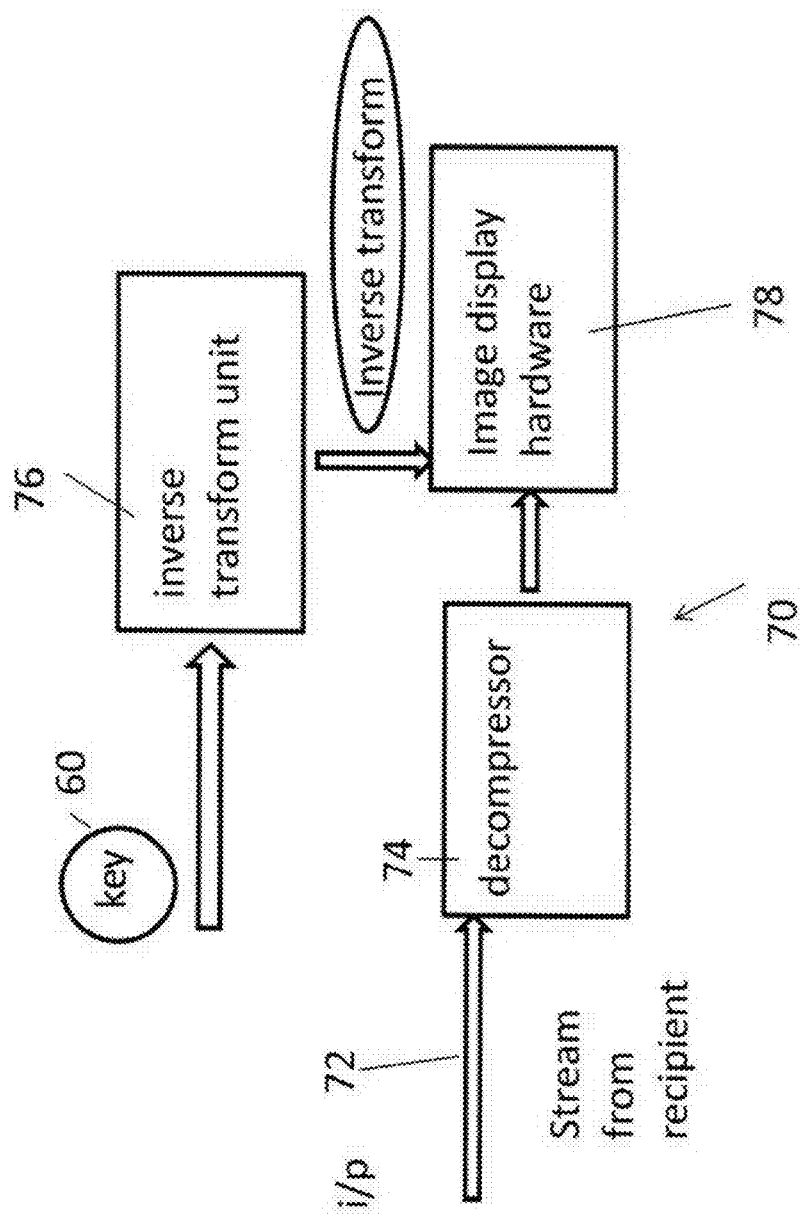
FIG. 2C is a simplified block diagram showing apparatus for displaying DRM protected media after receiving the bitstream generated in FIG. 2B.

Reference is now made to FIG. 2C, which illustrates apparatus 70 for managing DRM protection at an end user for receiving the bit stream and displaying the original image or a series of images or a succession of video frames. Apparatus 70 comprises an input 72 to receive the bitstream. Likewise key 60 is also obtained.

A decompressor 74 decompresses the bitstream.

An inverse transform unit 76 uses key 60 to create the inverse of the transform used on the source.

Image display hardware 78, applies the inverse transform and displays the image or series of images or succession of video frames to the user. The inverse transform is carried out in the image display hardware to make sure that the plaintext data is not made available outside for hacking. As will be discussed in greater detail below, an additional transform may be carried out in the image display hardware to ensure that even within the image display hardware, the plaintext is not available.

The transform 32 is now considered in greater detail.

Two suggested transforms for use in stage 32 are now described, as well as a frame-pair transform for use after the inverse transform in box 44.

Additive Transform

We assume that the image(s) are sourced in RGB 24-bit format, at 8 bits per channel per pixel. For every pixel channel, the source value is shifted right by one pixel giving an effective range of 0-127, instead of 0-255, this equates to 7 bits. Then the local value of a continuous pattern (itself in the range of 0-128) is added to the pixel value to complete the transform.

Now, the key to be delivered to the consumer in box 38 is the data required for the creation of the continuous pattern, and may be encoded by a regular stream or block cypher (such as AES). The inverse transform involves re-creating the pattern, subtracting it from the now decompressed transformed images, and then shifting the resulting pixel-channel values one place to the left, in effect multiplying the pixel values by two, and thereby returning them to their former 0-255 range.

It is noted that the one-bit data loss can be offset by using the option, which is available in the H.264 codec, for instance, of using 9-bit source material. In such a case the full 8 bits of source data may remain in the source frames, even after inserting a pattern within the 0-255 range.

The pattern may for example be a 7-bit grayscale bitmap, which is preferably at the same resolution as the frames themselves. The pattern may be filled out by setting a random value to every pixel whose coordinates (both X and Y) divide by 16, and using bi-linear or bi-cubic interpolation between these points. The interpolation guarantees a continuous pattern to the first or second degree, depending on the choice of interpolation method, and the 16-pixel distance equals the standard size of macroblocks in image and video codecs, which may further reduce artifacts.

The values of the selected points provides the key for reconstruction of the pattern at the recipient end. The key may be encrypted using the stream/block cipher and sent to the recipient.

Figure 4A:
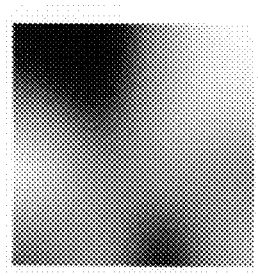
FIGS. 4A, 4B and 4C are exemplary additive transforms generated from the precursor of FIG. 3.
Figure 3:
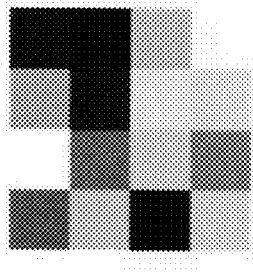
FIG. 3 is a simplified diagram showing a precursor for an additive transform according to an embodiment of the present invention.
Figure 4B:
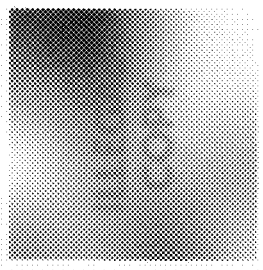
Figure 4C:
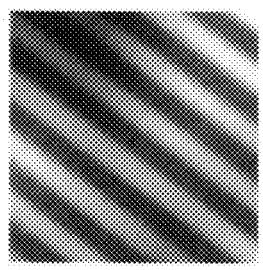

For example, the 4×4 key-pattern shown in FIG. 3 may be interpolated into the 64×64 additive pattern shown in FIGS. 4A-C using bilinear interpolation, in this case specifically bi cubic interpolation of an additive.

Figure 6A:
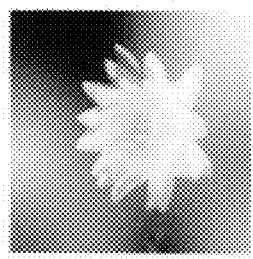
FIGS. 6A, 6B and 6C illustrate the images of FIGS. 5A-5C to which the additive transforms of FIGS. 4A, 4B and 4C have been applied according to an embodiment of the present invention.
Figure 5A:
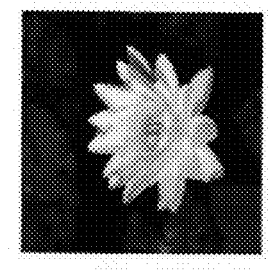
FIGS. 5A, 5B and 5C are an original image to which DRM may be applied according to embodiments of the present invention.
Figure 5B:
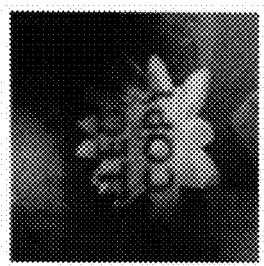
Figure 5C:
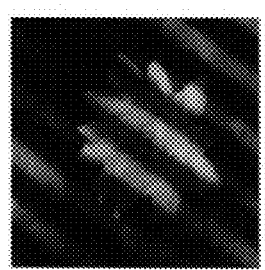
Figure 6B:
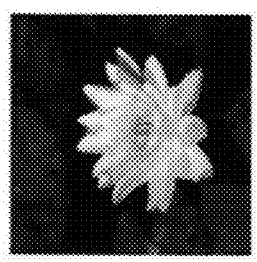
Figure 6C:
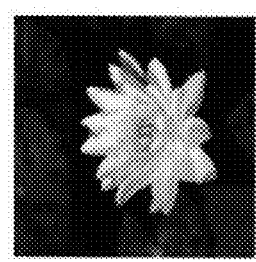

Use of the additive pattern to transform an image is shown with respect to FIGS. 5A-5C and 6A-6C. FIGS. 5A-5C illustrate a source image and FIGS. 6A-6C illustrate that same image following the additive transformation defined by FIGS. 4A-4C respectively.

Pixel-Mapping Transform

In a pixel mapping transform, a kind of geometric transform, a form of texture-mapping transforms the source image back and forth. A grid of junctions or vertices may be set at a distance of, for instance, 32 pixels apart, both vertically and horizontally, to form a source grid of vertices. Subsequently, the source grid is transformed into a protected form by creating a grid of target vertices identical to the source, and shifting every vertex up/down/left/right by up to 8 pixels along each axis, for example. Then the image is mapped from the source to the transformed using this vertex-grid for mapping. The amount and direction of the shift for each vertex provides the information used to make up the key to be encrypted and delivered to the consumer.

Frame-Pair Transform

A frame-pair transform is performed in stage 44 after the inverse transform, inside the display processing ASIC or GPU. The frame pair transform is carried out per pixel, directly after the inverse operation of the transform layer.

The concept of the frame-pair transform is that when averaged, every pair of consecutive frames still appear to the viewer to produce the original frame's pixel-values.

There should not be any sharp edges introduced by the frame-pair transform, as the eye tends to be sensitive to edges.

A particular way to achieve a frame pair transform is to form a continuous pattern, much like the pattern described in the additive transform and shown in FIGS. 4A-C.

The following pseudo-code algorithm is then applied to each pixel channel, meaning each pixel [x, y] and its corresponding pixel in the following frame:

```
OffsetSize=Pattern[x,y];
SourceValue=SourceImage[x,y];
If (OffsetSize>SourceValue) OffsetSize=SourceValue;
If (OffsetSize>MaxValue−SourceValue) OffsetSize=
MaxValue−SourceValue;
If (IsSecondFrameInPair) {
    OutputValue=SourceValue−OffsetSize;
} else {
    OutputValue=SourceValue+OffsetSize;
}
```

The pseudocode goes through the pixels one by one, taking the value of the pattern as an offset value. Now it has an offset value, a value of the pixel in the first frame and a value of the pixel in the second frame. The two pixels are set to have values plus and minus the offset, with corrections if the image maximum brightness is reached.

FIGS. 7, 8 and 9 illustrate operation of the algorithm. FIG. 7 illustrates the image of FIG. 5A from which the mask of FIG. 4A has been subtracted. FIG. 8 illustrates the image of FIG. 5A to which the mask of FIG. 4A has been added. FIG. 9 is the resultant of FIGS. 7 and 8 as seen by the human eye, and looks like a perfect reproduction of FIG. 5A, even though an image according to FIG. 5A does not exist at any point in the receiving end apparatus.

FIGS. 10, 11 and 12 illustrate a second frame pair transform. FIG. 10 illustrates the image of FIG. 5B from which a different mask has been subtracted. In this case, the mask of FIG. 4A is supplemented with the wording 'illegal copy' in dark to produce the mask shown in FIG. 4B. FIG. 8 illustrates the image of FIG. 5B to which the same mask has been added. FIG. 12 is the resultant of FIGS. 10 and 11 as seen by the human eye, and looks like a perfect reproduction of FIGS. 5A-C, even though an image according to FIGS. 5A-C does not exist at any point in the receiving end apparatus.

FIGS. 13, 14 and 15 illustrate operation of the algorithm using a third frame pair transform. In this case, a new mask is created by alternatively adding and subtracting the mask of FIG. 4A in stripes to form the mask of FIG. 4C. FIG. 13 illustrates the image of FIG. 5C from which the mask of FIG. 4C has been subtracted. FIG. 14 illustrates the image of FIG. 5C to which the mask of FIG. 4C has been added. FIG. 15 is the resultant of FIGS. 13 and 14 as seen by the human eye, and looks like a perfect reproduction of FIG. 5C, even though an image according to FIG. 5C does not exist at any point in the receiving end apparatus.

It is expected that during the life of a patent maturing from this application many relevant DRM management systems will be developed and the scope of the term DRM is intended to include all such new technologies a priori.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise.

It is appreciated that certain features of the invention, which are, for clarity, described in the context of separate embodiments, may also be provided in combination in a single embodiment, and the above description is to be construed as if this combination were explicitly written. Conversely, various features of the invention, which are, for brevity, described in the context of a single embodiment, may also be provided separately or in any suitable subcombination or as suitable in any other described embodiment of the invention, and the above description is to be construed as if these separate embodiments were explicitly written. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of DRM protection for an image or a series of images or a succession of video frames, the method comprising:
    generating a reversible transform;
    applying said reversible transform to a source image;
    compressing said transformed image into a bitstream;
    supplying said bitstream to a recipient for consumption, said transform ensuring that a decompression operation at said recipient does not reveal said source image wherein said generating a reversible transform comprises generating a grid of pixels with varying values and then interpolating between said pixels to form a mask and each pixel value of said mask is added to a corresponding pixel value of said source image.

2. The method of claim 1, wherein said source image pixel value is an 8-bit value and said mask value is a 7-bit value and said source image is right shifted one place prior to said adding.

3. The method of claim 1, wherein said source image pixel value is an 8-bit value placed within a 9 bit value, and said mask value is a 7-bit value.

4. The method of claim 1, wherein said generating said reversible transform comprises generating a grid of pixels, and shifting each pixel by a variable number up to a predetermined maximum of pixel positions to form a map, and said applying said transform comprises mapping said source image using said map to form a geometrically distorted version of said source image.

5. The method of claim 1, further comprising:
generating a key that enables generation of an inverse of said transform; and
supplying to said recipient a user client and said key.

6. The method of claim 1, wherein said generating said inverse of said transform comprises generating a grid of pixels, and shifting each pixel by a variable number taken from said key to form a map, and said applying said inverse transform comprises mapping an image extracted from said decompressed bitstream using said map to recover an original geometry of said source image.

7. A method of managing DRM protection at an end user for an image or a series of images or a succession of video frames, the method comprising:
receiving from a source, a bitstream, the bitstream comprising a compressed version of a reversibly transformed source image or a series of source images or a succession of source video frames and a key;
decompressing said bitstream;
supplying said decompressed bitstream to image display hardware;
using said key to create an inverse transform of a reversible transform used on said source;
applying said inverse transform at said image display hardware; and
displaying said image or said series of images or said succession of video frames wherein said generating an inverse of said transform comprises generating a grid of pixels with values extracted from said key and then interpolating between said pixels to form a mask and each pixel value of said mask is subtracted from a corresponding pixel value of said source image.

8. The method of claim 7, wherein a source image pixel value is an 8-bit value and a mask value is a 7-bit value and said source image is left shifted one place following said subtracting.

9. The method of claim 7, comprising, subsequently to said applying said inverse transform and prior to said display, for successive frames, for corresponding pairs of pixels in each frame, applying offsets to each pixel such that an average value of each respective pair is retained.

10. The method of claim 9, comprising obtaining said offsets by generating a grid of pixels with varying values, interpolating between said pixels to form a mask, and for each of said pair of pixels, using a corresponding mask pixel value as a respective offset.

11. A method of DRM protection for an image or a series of images or a succession of video frames, the method comprising:
generating a reversible transform, wherein said generating a reversible transform comprises generating a grid of pixels with varying values and then interpolating between said pixels to form a mask and adding each pixel value of said mask to a corresponding pixel value of said source image;
applying said reversible transform to a source image;
compressing said transformed image into a bitstream;
supplying said bitstream to a recipient for consumption, said transform ensuring that a decompression operation at said recipient does not reveal said source image; and
at said recipient:
decompressing said bitstream;
supplying said decompressed bitstream to image display hardware;
using a key to create an inverse transform of said reversible transform used on said source;

at said image display hardware applying said inverse transform; and
displaying said image or said series of images or said succession of video frames.

12. The method of claim 11, wherein said generating said reversible transform comprises:
generating a grid of pixels, and shifting each pixel by a variable number up to a predetermined maximum of pixel positions to form a map; and said applying said transform comprises mapping said source image using said map to form a geometrically distorted version of said source image;
and wherein said generating said inverse of said transform comprises:
generating a grid of pixels, and shifting each pixel by a variable number taken from a key to form a map, and said applying said inverse transform comprises mapping an image extracted from said decompressed bitstream using said map to recover an original geometry of said source image.

13. The method of claim 11, comprising, subsequently to said applying said inverse transform and prior to said display, for successive frames, for corresponding pairs of pixels in each frame, applying offsets to each pixel such that an average value of each respective pair is retained.

14. The method of claim 13, comprising obtaining said offsets by generating a grid of pixels with varying values, interpolating between said pixels to form a mask, and for each of said pair of pixels, using a corresponding mask pixel value as a respective offset.

15. Apparatus for DRM protection for an image or a series of images or a succession of video frames, the apparatus comprising:
a transform generator configured to generate a reversible transform, wherein said reversible transform comprises a grid of pixels with varying values and interpolation between said pixels to form a mask and wherein each pixel value of said mask is added to a corresponding pixel value of said source image;
a transformation unit configured to apply said reversible transform to a source image;
a compression unit configured to compress said transformed image into a bitstream;
an output configured to supply said bitstream to a recipient for consumption, said transform ensuring that a decompression operation at said recipient does not reveal said source image.

16. Apparatus for managing DRM protection at an end user for an image or a series of images or a succession of video frames, the apparatus comprising:
an input for receiving from a source, a bitstream, the bitstream comprising a compressed version of a reversibly transformed source image or a series of source images or a succession of source video frames and a key;
a decompressor for decompressing said bitstream;
an inverse transform unit configured to use said key to create an inverse transform of a reversible transform used on said source, wherein said inverse of said transform comprises a grid of pixels formed with values extracted from said key and interpolations between said pixels to form a mask, each pixel value of said mask being subtracted from a corresponding pixel value of said source image;

image display hardware configured to apply said inverse transform at said image display hardware and display said image or said series of images or said succession of video frames.

* * * * *